UNITED STATES PATENT OFFICE.

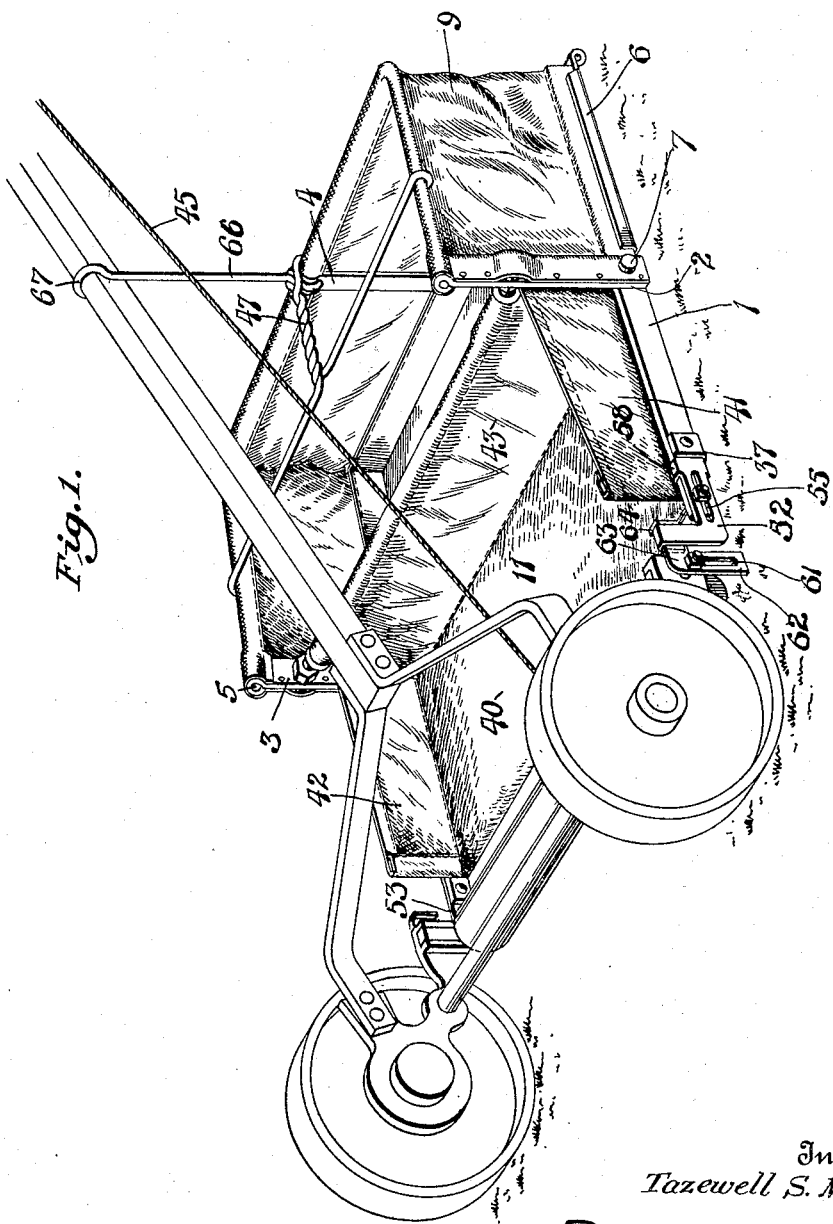

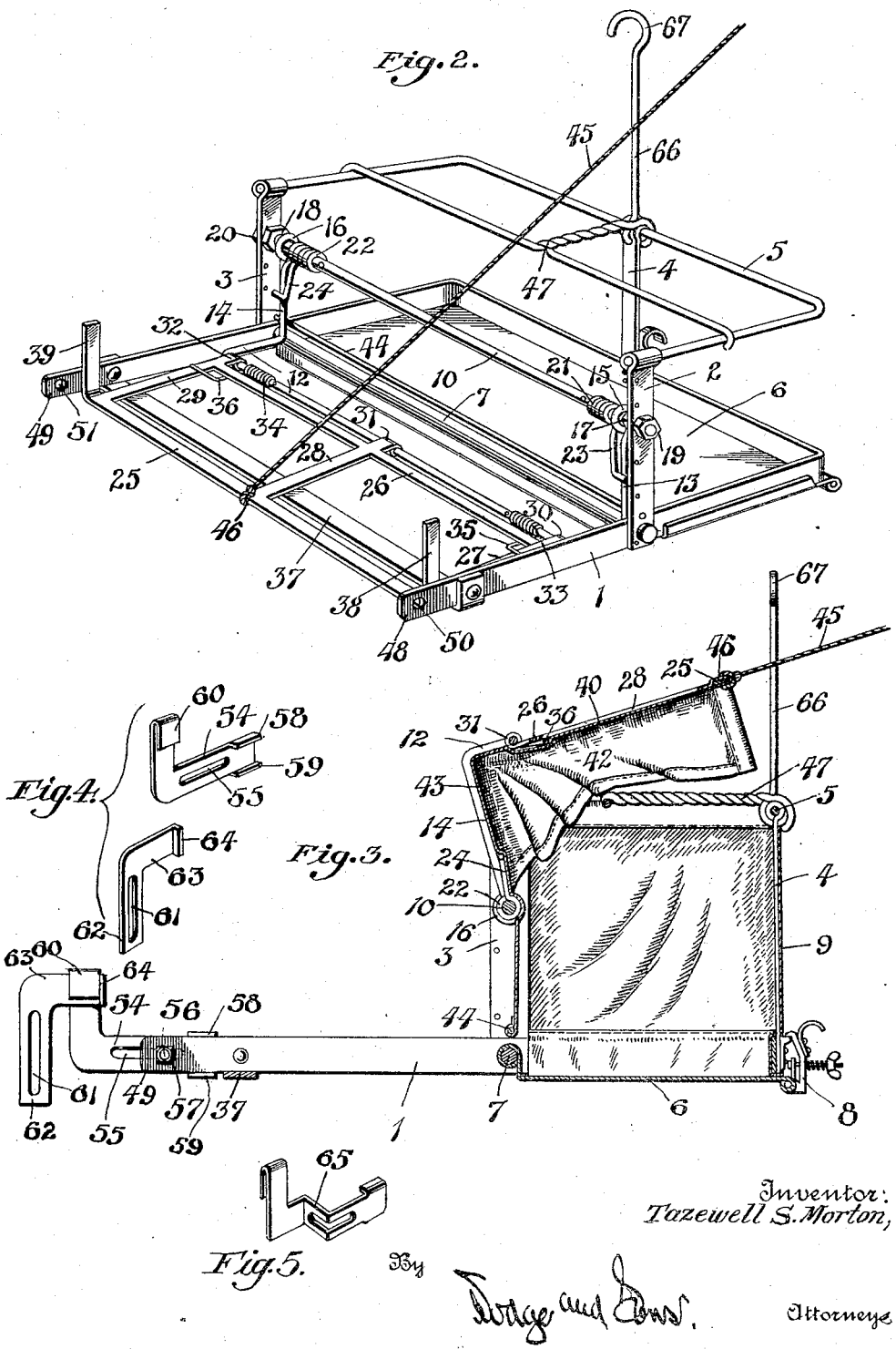

TAZEWELL S. MORTON, OF BIRMINGHAM, ALABAMA.

DETACHABLE GRASS-CATCHER FOR LAWN-MOWERS.

1,211,740.      Specification of Letters Patent.      Patented Jan. 9, 1917.

Application filed November 26, 1915. Serial No. 63,477.

*To all whom it may concern:*

Be it known that I, TAZEWELL S. MORTON, a citizen of the United States, residing at Birmingham, in the county of Jefferson and State of Alabama, have invented a certain new and useful Improvement in Detachable Grass-Catchers for Lawn-Mowers, of which the following is a specification.

My invention pertains to an improvement in grass-catching attachments for lawn-mowers of that class wherein the means for receiving the cut grass comprise a receptacle for the initial reception of the same, and a relatively larger compartment, to which the grass is transferred periodically, and from which latter it may be deposited at any desired point.

Devices of this character have heretofore been designed and constructed with a view to their use in connection with double-handled mowers. The handle members thereof being spaced well apart, afford ample room within which the smaller receptacle may move, as it swings upwardly and rearwardly above the storing compartment for the purpose of discharging its contents.

The object of my invention is to provide a device of the same general character as that just described, the design and construction being modified however, to suit the particular requirements of the single-handled mower.

While the construction is especially adapted for use in conjunction with mowers of the single-handle type which are most commonly employed, still it is also applicable to mowers having the double-handle construction.

This invention has as a further object, the provision of a separate and distinct grass-collecting compartment, which will allow ready attachment to, and efficient operation in connection with, any of the ordinary types of grass-catchers, such as the common scoop form now on the market.

With these objects in view, my invention consists primarily, of a grass-catcher of the general class described, but in which the forward receptacle or apron which collects the cut grass, is so constructed that it will, during its swinging movement to the rear and above the storing compartment partially collapse or fold upon itself, thus enabling it to pass without obstruction beneath the mower handle, additional means being provided for automatically restoring the receptacle to its initial position.

In the drawings, Figure 1 is a perspective view of my improved grass catcher attached to a mower of the ordinary type, the collecting receptacle thereof being shown in its normal position, in which it is adapted to receive the grass as it leaves the cutting mechanism; Fig. 2 represents the frame or skeleton of the device, the canvas or cloth forming the walls and also the bottom of the forward receptacle and the walls of the rear receptacle having been removed therefrom to more clearly show the construction of the device; Fig. 3 is a vertical section taken longitudinally through the center of the catcher, showing the relative positions of the several parts as the primary or collecting receptacle discharges its contents into the larger compartment; and Figs. 4 and 5 represent in perspective, fastening members adapted to secure and support the forward portion of the grass-catcher on the mower, and by means of which the catcher may be adjusted to secure its most efficient operative position therewith.

Referring more specifically to the drawings, wherein similar characters represent like parts throughout the several views, 1 indicates a U-shaped member forming the base of the grass catcher, the same being provided with vertically disposed side members 2, 3 and 4, rigidly secured thereto and supporting a horizontal frame member 5 at the upper ends thereof. A drop bottom 6 pivotally mounted on a rod 7 having bearings in the sides of base-member 1 and the lower ends of side-members 2 and 3 secured thereto, is held in closed position by means of a spring tensioned latch 8. A canvas strip 9, extending between and attached to horizontal members 1 and 5 and upright members 2, 3 and 4 of the frame, serves to complete that part of the device adapted ultimately to receive and store the grass, and which may be termed the storage compartment or receptacle.

Located forward of the open end of the above-described compartment and having its upper edge pivotally attached to a rod 10 carried by the side members 2, 3, thereof, is a collapsible or foldable receptacle 11, the skeleton or frame of which comprises a pair of hinge-connected members hereinafter set forth in detail. As best shown in Fig. 2 of the drawings, the rear section of the skeleton frame comprises a bail shaped member 12, the extremities or arms 13 and 14 of which, at a point slightly distant from the main body or cross bar of the bail, are canted or bent upwardly and stand in a substantially vertical position. At their outer extremities arms 13 and 14 are provided with eyes 15 and 16, by means of which the rear frame member of receptacle 11 is pivotally mounted on rod 10. Said rod 10 being threaded back a sufficient distance from each end thereof, is provided with stop-nuts 17 and 18 and securing-nuts 19 and 20 mounted thereon, and adapted when adjusted, to secure said rod against lateral movement in its supporting members 2 and 3. Rod 10 thus serves in a large degree, to strengthen the side walls of the storage compartment through its rigid connections with members 2 and 3 thereof, and also forms the hinge rod or support for the forward receptacle.

The collecting receptacle 11 is readily releasable by removing the outside securing nuts 19 and 20 from the rod 10 and springing the supporting members 2 and 3 apart sufficiently to free the rod. This receptacle 11 may be mounted in a similar manner in any ordinary grass catcher of the scoop type, the attachment being made by the securing nuts 19 and 20 in the general manner already described, or by any equivalent attaching means suitable for the purpose.

Mounted on rod 10 near the extremities thereof and rigidly secured thereto at their inner ends, are two coil-springs 21, 22, the outer ends of which form projecting L-shaped arms 23, 24, adapted to bear upon the arms 13, 14, to maintain the forward receptacle and its supporting frame in its normal position as shown in Figs. 1 and 2.

The forward section of the skeleton frame of the collecting receptacle 11, consists of two parallel strips or bars 25, 26, forming the front and rear edges thereof, and connected by cross bars 27, 28 and 29. The said cross strips are continued beyond their connections with strip 26 to form eyes 30, 31 and 32, adapted to form a hinged connection with the main bar of the bail-shaped member 12.

Additional coil springs 33, 34, similar to those on rod 10, are mounted on and affixed to the connecting portion of member 12. The projecting arms 35, 36 of said springs which bear upon the cross bars 27 and 29 of the forward frame member, tend to maintain said member in its horizontal position resting upon a cross bar 37, connecting the projecting arms of base member 1. The front strip 25 of the forward frame member is extended beyond its connections with cross-bars 27 and 29, to form vertical members 38 and 39.

A canvas or other flexible covering consisting of a bottom 40, side walls 41, 42 and a rear wall 43, serves to complete the primary or collecting receptacle. The said flexible covering is secured thereto by any suitable means, as riveting or stitching the same to the several parts of the frame. The rear wall 43 of the above-described covering is continued beyond the hinge-rod 10 and its outer edge secured to a cross rod 44 mounted in upright members 2 and 3 of the rear compartment immediately above rod 7 likewise secured therein. Thus a relatively low wall or partition serving to prevent the escape of grass therefrom is formed in the otherwise open end of the rear compartment.

The means for operating the forward or collecting receptacle 11, consists of a cord or like member 45, secured thereto through a perforation in the forward frame member at point 46 in the front strip 25 thereof, and extending rearwardly therefrom to the cross handle of the mower (not shown) where it is secured in a position and manner convenient to the use of the operator.

As a means of rendering the storage compartment more rigid and at the same time serving as a ready means for removing the entire device from the mower, a T-shaped member 47 of heavy twisted wire is secured to the upper member 5 of the rear compartment by partially bending the extremities of said reinforcing member about the upper frame 5.

The device may be positioned or secured upon the mower in any of the numerous ways common to such attachments, but preferably as shown in the drawings. The forward projecting portions 48, 49 of base member 1 are respectively provided near their ends with perforations 50, 51 adapted to receive suitable bolts for securing angle pieces 52, 53 thereto. The upper member shown in Fig. 4 represents one of these connecting pieces, they both being of similar construction. The lower arm 54 of said member is provided with a horizontal slot 55 adapted as shown in Fig. 3 to receive the outer end of a bolt 56 secured therein by a nut 57. Projections 58, 59 are formed on the upper and lower edges respectively of the horizontal arm 54 of the connecting member at its rear end, the said projections being adapted to coact with the edges of base member 1, when the connecting piece is bolted thereto, to secure the latter against movement about bolt 56. A hooked portion 60 is formed on the upper end of the upright arm of said connecting member, the same being adapted to engage with and rest on its hereinafter described supporting member on the mower. The lower member of Fig. 4 represents one of the said supporting members, the same being adapted to be attached to the mower, as best shown in Fig. 1 of the drawings. The more common type of lawn-mower is usually provided with a ground roller located at the rear of the cutting mechanism and having bearings in the side frames of the mower. Ordinarily the supporting means for the roller is provided with bolts projecting through the frame members of the mower and secured therein by means of suitable nuts bearing on the outer faces of the frames. On the projecting portions of each of these bolts, a supporting member (such as the lower member shown in Fig. 4) is adapted to be secured against the frame by means of the nut on said bolt, the projecting portion of the bolt passing through a slot 61 in the depending arm 62 of said supporting member. At the end of the horizontal arm 63 of the supporting member is formed a lateral projection 64, adapted when the connecting member is placed thereon to bear against the hook portion 60 and prevent accidental disconnection of the several parts. Thus by means of the above described angle pieces the front part of the catcher may be readily attached to or removed from the mower. As can readily be seen, the slots provided in the connecting pieces 52, 53 will allow of the ready adjustment of the catcher toward or from the ground roller, while those in the supporting pieces attached to the mower will provide means of adjusting the forward part of the catcher up or down as may suit the construction of the mower used. As is often the case, the catcher may be somewhat too narrow or too wide for the mower, but as shown in Fig. 5 this difficulty may be overcome by forming an offset 65 in the connecting members sufficient to compensate for the difference in the widths of the mower and the catcher to be attached to the same.

As a means of supporting the rear portion of the catcher at its proper height above the ground, I provide a link member 66 suitably secured at its lower end to the upright member 4 where the same engages frame member 5, and forming at its upper end a hook 67 adapted to engage the handle of the mower.

In the operation of my device, the collecting receptacle 11, upon the accumulation of a substantial amount of grass therein, is swung by means of operating cord 45 into the inverted position shown in Fig. 3, whereby the grass is deposited in the rear receptacle. By virtue of the hinged connection between its frame members, the receptacle 11, simultaneously with its upward and rearward swinging movement, partially collapses or folds upon itself, thus allowing its ready passage beneath the mower handle. The collecting receptacle 11, following the releasing of operating cord 45 after each movement above and deposit in the rear compartment, is automatically restored to its normal horizontal position and open form by the coil springs 21, 22 and 33, 34. When the storage compartment has been filled with grass, or at any time the operator may deem it necessary, the said compartment may be emptied by means of drop bottom 6.

I do not wish to restrict myself to the particular means herein shown and described of attaching the collapsible receptacle to the compartment adapted to ultimately receive the grass therefrom, but contemplate that said receptacle may be provided at its rear end with any suitable means whereby it may be pivotally mounted within and across the open end of any of the ordinary trough shaped devices heretofore made and used. Nor do I limit myself to the exact manner described of forming the supporting frames of the receptacle or the connecting means between the same or any of their parts in so far as the generic claims are concerned.

Having thus described my invention, what I claim is:—

1. A grass catcher adapted to be attached to a lawn-mower comprising in combination a stationary receptacle; means for attaching the same to a mower; a collapsible collecting receptacle resting normally in an open position forward of said stationary receptacle; a pivotal connection between the rear of said collecting receptacle and the front of said stationary receptacle; and operating means for moving the collecting receptacle from its normal position to a discharge position above the stationary receptacle.

2. A grass catcher adapted to be attached to a lawn-mower comprising in combination a stationary receptacle; means for attaching the same to a mower; a collecting receptacle comprising a plurality of sections, hinged together, said receptacle resting normally in an open position forward of said stationary receptacle; a pivotal connection between the rear of said collecting receptacle and the front of said stationary receptacle; and operating means for moving the collecting receptacle from its normal position to a discharge position above the stationary receptacle.

3. A grass catcher adapted to be attached to a lawn-mower comprising in combination a stationary receptacle; means for attaching the same to a mower; a spring-distended, collapsible receptacle resting normally in an open position forward of said stationary receptacle; a pivotal connection between the rear of said collapsible receptacle and the front of said stationary receptacle; and operating means for moving the collapsible receptacle from its normal position to a discharge position above the stationary receptacle.

4. A grass catcher adapted to be attached to a lawn-mower comprising in combination a stationary receptacle; means for attaching the same to a mower; a two-part foldable receptacle hingedly connected to the forward wall of said stationary receptacle and resting normally in an open position forward thereof; spring members interposed between the parts of said foldable receptacle to maintain the same in open form; spring members coacting with the hinged connections between the foldable receptacle and the stationary receptacle, to restore the former to its normal position; and means for moving said foldable receptacle from its normal position to a discharge position above the stationary receptacle.

5. A detachable, collapsible grass-collector for grass catchers comprising a plurality of sections hinged together; means for normally holding said sections in an open position; attaching means mounted on the rear of said collector for pivotally securing the same within and transversely of the open end of a grass-catcher; means coacting with said attaching means for retaining said collector in its normal distended or horizontal position; and operating means for moving said collector from its normal position to an inverted discharge position above said grass-catcher.

6. A supplementary, detachable receptacle for grass-catchers, comprising in combination a rear wall; a bottom or floor hinged to the lower portion of said rear wall, and flexible side walls or wings; means for normally holding the floor in position away from the rear wall; and means for pivotally securing the supplementary receptacle in working relation with a grass-catcher.

7. A grass catcher adapted to be attached to a lawn mower comprising in combination a stationary receptacle, supporting arms extending horizontally forward therefrom, an L-shaped retaining member attached to and horizontally adjustable on each of said supporting arms, the said connecting members being each provided with a hook portion at the upper end of its vertically disposed arm; a similar L-shaped supporting member attached to and vertically adjustable on each of the side frames of a mower, the horizontally disposed arm of each of said supporting members being provided with a projection at its end adapted to retain the hook portion of the retaining member thereon when the same is in engagement with said arm; and means for attaching the rear end of the catcher to a mower handle.

In testimony whereof I have signed my name to this specification.

TAZEWELL S. MORTON.

Copies of this patent may be obtained for five cents each, by addressing the "Commissioner of Patents, Washington, D. C."